US005631592A

United States Patent [19]
Schwarz et al.

[11] Patent Number: 5,631,592
[45] Date of Patent: May 20, 1997

[54] PULSE GENERATION/SENSING ARRANGEMENT FOR USE IN A MICROPROCESSOR SYSTEM

[75] Inventors: Roland H. Schwarz, Geneva, Switzerland; William D. Huston, Jr., Austin, Tex.

[73] Assignee: Motorola, Inc., Schaumburg, Ill.

[21] Appl. No.: 611,612

[22] Filed: Mar. 8, 1996

Related U.S. Application Data

[63] Continuation of Ser. No. 129,824, Sep. 30, 1993, abandoned.

[30] Foreign Application Priority Data

Oct. 3, 1992 [GB] United Kingdom ............. 9220847

[51] Int. Cl.$^6$ .......................... H03K 5/04; H03K 5/135; H03K 7/08
[52] U.S. Cl. ................ 327/172; 327/31; 327/291; 327/24
[58] Field of Search ............ 307/265, 266, 307/267, 268; 328/61; 327/23–26, 31, 36, 37, 172–176, 291, 299

[56] References Cited

U.S. PATENT DOCUMENTS

| | | | |
|---|---|---|---|
| 3,621,403 | 11/1971 | Seiy | 328/61 |
| 3,836,858 | 9/1974 | Kitano | 307/265 |
| 3,982,108 | 9/1976 | Horsley | 235/92 EA |
| 4,160,154 | 7/1979 | Jennings | 235/92 EA |
| 4,236,114 | 11/1980 | Sasaki | 328/61 |
| 4,341,950 | 7/1982 | Kyles et al. | 235/92 EA |
| 4,511,846 | 4/1985 | Nagy et al. | 307/268 |

(List continued on next page.)

FOREIGN PATENT DOCUMENTS

| | | | |
|---|---|---|---|
| 76129A2 | 4/1983 | European Pat. Off. | 327/175 |
| 0444911A1 | 9/1991 | European Pat. Off. | H03K 23/40 |
| 0464592A2 | 1/1992 | European Pat. Off. | H03K 21/12 |
| 359207725 | 11/1984 | Japan | 327/175 |
| 62-289012 | 12/1987 | Japan | 327/175 |
| 284812 | 3/1990 | Japan | 327/23 |
| 4302524 | 10/1992 | Japan | 327/172 |
| 2235103 | 2/1991 | United Kingdom | 327/175 |

OTHER PUBLICATIONS

Ira Horden, "16–bit EPROM Microcontroller With Alterable I/O and Buswidth Opens New Applications Areas", Wescon 86/Conf. Record, vol. 30, No. 16/2, 18–20 Nov. 1986, Los Angeles, USA, pp. 1–7.

S. Storandt et al., "SAB 80515—a Standard Microcontroller of the SAB 8051 Family", Siemens Components, vol. 20, No. 5, Oct. 1985 Berlin, DE, pp. 184–188.

John F. Stockton, "The MC6801 Gets a CMOS Cousin", Mini–Micro Conf. Record, No. 18/1, May 1984, Northeast, NY, USA, pp. 1–5.

A.E. Hall et al., "Microprocessor–Controlled Programmable Event Timer", IBM Technical Disclosure Bulletin, vol. 27, No. 4B, Sep. 1984, Armonk, USA, pp. 2459–2460.

*Primary Examiner*—Timothy P. Callahan
*Assistant Examiner*—T. Lam

[57] ABSTRACT

A pulse generation and sensing arrangement in a microprocessor system (100) includes an input/output terminal (130) which receives an input signal or produces an output signal, an edge detector (132) which senses pulse edges in the input signal, timers (108, 110) which produce time values, registers (120, 124, 126) which hold time values produced by the timers corresponding to edges detected by the edge detector or which hold values corresponding to pulse edges to be generated, comparators which compare the values held in the registers with time values produced by the timers, and a flip-flop (128) for generating a signal whose state changes in response to the comparators. The arrangement allows the generation and/or sensing of signals with short pulse widths and a wide range of duty cycles, and minimizes software overhead. A continuous PWM signal may be generated without further software involvement after initial writing of edge values.

12 Claims, 5 Drawing Sheets

U.S. PATENT DOCUMENTS

| | | | |
|---|---|---|---|
| 4,519,091 | 5/1985 | Chu et al. | 377/44 |
| 4,562,549 | 12/1985 | Tanaka et al. | 307/265 |
| 4,713,832 | 12/1987 | Hutson | 377/45 |
| 4,722,004 | 1/1988 | Miyamoto et al. | 327/31 |
| 4,870,665 | 9/1989 | Vaughn | 327/172 |
| 4,881,248 | 11/1989 | Korechika | 377/17 |
| 4,991,186 | 2/1991 | Payen et al. | 377/44 |
| 5,198,785 | 3/1993 | Jordan | 307/265 |
| 5,223,742 | 6/1993 | Schumacher | 307/265 |
| 5,365,183 | 11/1994 | Mitsuhira | 327/144 |
| 5,371,770 | 12/1994 | Sakuma | 327/144 |
| 5,479,118 | 12/1995 | Niijima | 327/37 |

PULSE GENERATION/SENSING ARRANGEMENT FOR USE IN A MICROPROCESSOR SYSTEM

This application is a continuation of prior patent application Ser. No. 08/129,824 filed Sep. 30, 1993, now abandoned.

BACKGROUND OF THE INVENTION

This invention relates to pulse generation and/or sensing in microprocessor systems.

Pulse generation and/or sensing in microprocessor systems is conventionally accomplished by the use of a counter (timer) module associated with the microprocessor, typically integrated together as a microcontroller chip. Generating or sensing pulses typically takes a long time in relation to the processor execution time and typically suffers from some associated limitations.

In a typical application, the software running on the microprocessor has to be interrupted frequently to save intermediate captured timer values and to update output pulse timer values. In typical usage, the timing registers allow only single operations, after which the processor must save or update the current value. For example, to measure the width of a pulse using a timer with a single input capture register, the software must initially be informed that the pulse's first edge has occurred (e.g., via a flag bit and/or an interrupt), then it reads and saves a first value from the timer; then the software must await the pulse's second edge and read the associated timer value before it can calculate the pulse's width. Similarly, to create an output pulse, the software must provide the time of the pulse's first edge and then await the occurrence of that edge; after the pulse's first edge has occurred, the software can then provide the time of the pulse's second edge. In both such input measurement and such output pulse generation, the software response time limits the minimum pulse width that can be measured or generated.

SUMMARY OF THE INVENTION

In accordance with the invention there is provided a pulse generation and sensing arrangement for use in a microprocessor system, the arrangement comprising:

an input node for receiving thereat an input signal;

edge detection means coupled to the input node for sensing pulse edges in the input signal;

timer means for producing time values;

input register means responsive to the edge detection means for holding time values produced by the timer means corresponding to edges detected by the edge detection means;

an output node for producing thereat an output signal;

output register means for holding values corresponding to pulse edges to be generated;

comparator means for comparing the values held in the output register means with time values produced by the timer means; and bistable means coupled to the output node for generating at the output node a signal whose state changes in response to the comparator means.

It will be understood that such an arrangement allows the generation and/or sensing of signals with short pulse widths and a wide range of duty cycles, and minimises software overhead. In a preferred embodiment, a continuous PWM signal may be generated without further software involvement after initial writing of edge values.

BRIEF DESCRIPTION OF THE DRAWINGS

One microprocessor system employing pulse generation and sensing in accordance with the present invention will now be described, by way of example only, with reference to the accompanying drawings, in which.

DESCRIPTION OF THE PREFERRED EMBODIMENT

Figure 1:
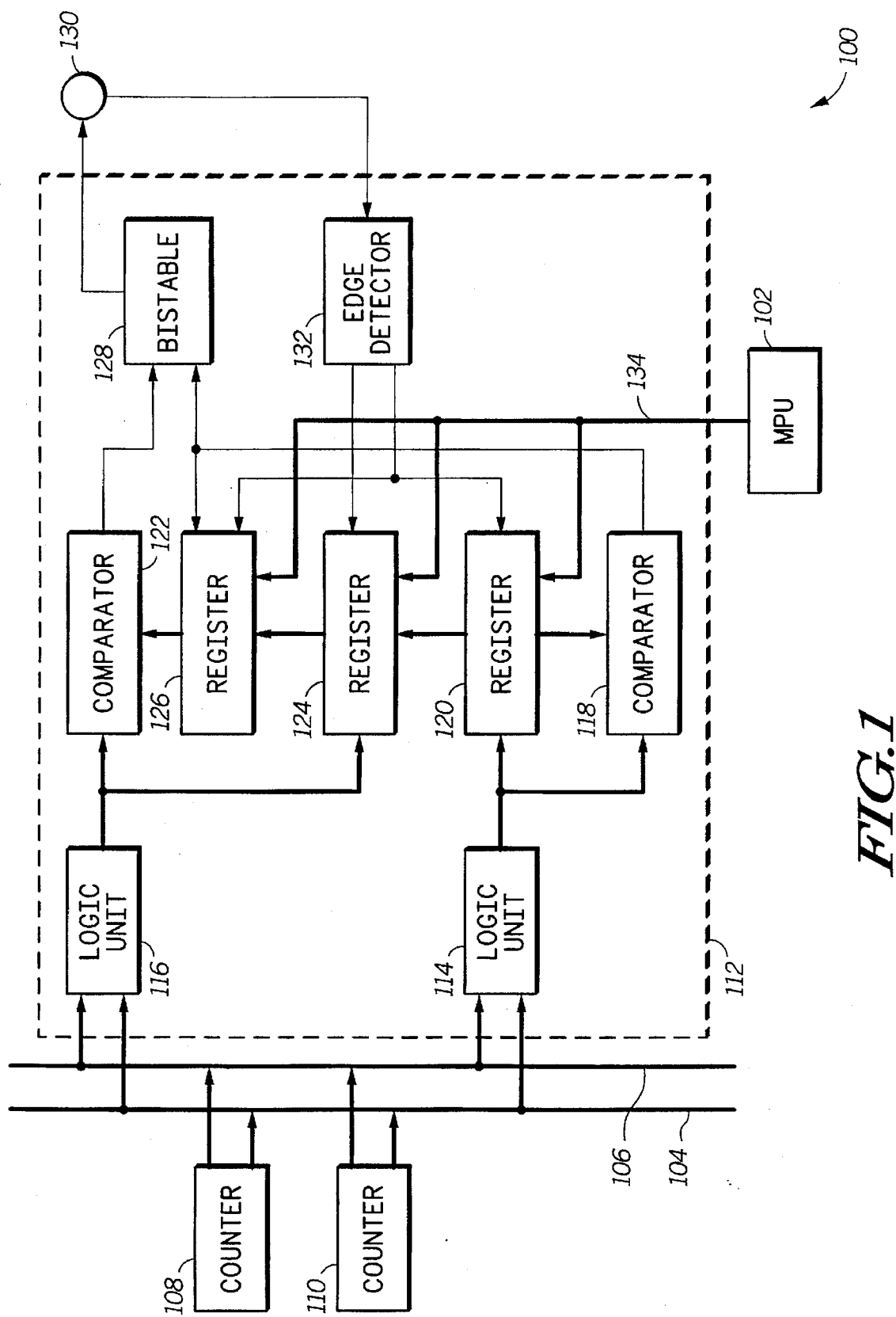
FIG. 1 shows a block-schematic circuit diagram of a double edge timing unit of the system.

Referring now to FIG. 1, a microprocessor system 100 having pulse generation and measurement ability includes a microprocessor 102 having two time-based buses 104 and 106. Two counter units 108 and 110 are coupled to each of the buses 104 and 106.

A double edge timing unit 112 includes two bus select logic units 114 and 116 coupled to each of the data buses 104 and 106. The output of the bus select logic unit 114 is coupled to a comparator 118 and to a register 120. The output of the bus select logic unit 116 is coupled to a comparator 122 and to a register 124. The register 124 is coupled to a register 126, which is coupled to the comparator 122. The register 120 is coupled both to the comparator 118 and to the register 124. The microprocessor 102 which uses processor interface bus 134.

The outputs of the comparators 118 and 122 are connected to inputs of an output flip-flop bistable device 128, whose output is connected to an input/output pin 130 of the system. The output of the comparator 118 is also connected to the register 126. The input/output pin 130 is connected to a conventional edge detector 132 which provides edge-detection outputs respectively to the register 124 and to the registers 120 and 126. The microprocessor 102 uses processor interface bus 134 to provide data to, and to obtain data from, the registers 120, 124 and 126.

The arrangement of FIG. 1 constitutes a generic arrangement in which pulses can be generated at the input/output pin 130, or sensed at the same pin, by using the registers and comparators of the double edge timing unit 112 without further software overhead from the microprocessor 102 after initialization.

In the arrangement of FIG. 1, when an input pulse on the input pin 130 is measured, the registers are used as input capture registers to capture a timer count value from the counters 108, 110 when the edge detector unit 132 detects pulse edges, the respective count values being subsequently used by the microprocessor software to calculate the desired parameters of the input pulse.

Also in the arrangement of FIG. 1, when an output pulse on the input pin 130 is generated, the comparators 118 and 122 are used to compare register values (which determine respectively the pulse's leading and trailing edges, and which have been previously stored in the registers by the microprocessor 102) with timer count values from the counters 108, 110. The comparator outputs are used to change the state of the flip-flop 128 accordingly to produce pulses at the output pin 130.

The generic arrangement of FIG. 1 can be employed in four distinct operational modes:

1) input double edge pulse width measurement mode, allowing two consecutive input captures on opposite polarity edges without software intervention;

2) input period measurement mode, allowing two consecutive input captures on the same polarity edge without software intervention;

3) one-time double edge pulse output compare mode, allowing both edges of an output pulse to be generated without software intervention; and 4) continuous output pulse-width-modulation (PWM) mode, allowing the generation of a continuous PWM output without software intervention.

The versatility of the arrangement of FIG. 1 centres around the two comparators 118 and 122 and the three registers 120, 124 and 126. The register values can be loaded from one register to another (register 120 to register 124, and register 124 to 126) depending on the selected mode. Registers 120 and 124 can also be loaded with values from the selected counters.

Although two counters 108 and 110 are shown in the arrangement of FIG. 1 and it is clear that the two bus selectors 114 and 116 allow one or both of these counters to be used as desired, the choice of whether to use one or both of these counters depends on the particular implementation. For the sake of simplicity, the following descriptions of the distinct operational modes assume the use of only one counter.

The four distinct operational modes will now be described in detail. In each of the these modes a flag is set and can be used to request an interruption of the processor software. In each of the following descriptions it is assumed that the implementations are of 16-bit systems, but it will be understood that the same functions can be implemented with any number of bits. It will also be assumed in the following descriptions that a modulus or free-running counter is used, but it will be understood that any other kind of counter may alternatively be used. It will be seen from the following descriptions that it is advantageous for only two of the three registers 120, 124 and 126 to be visible to the software.

Input Double Edge Pulse Width Measurement Mode

Figure 2:
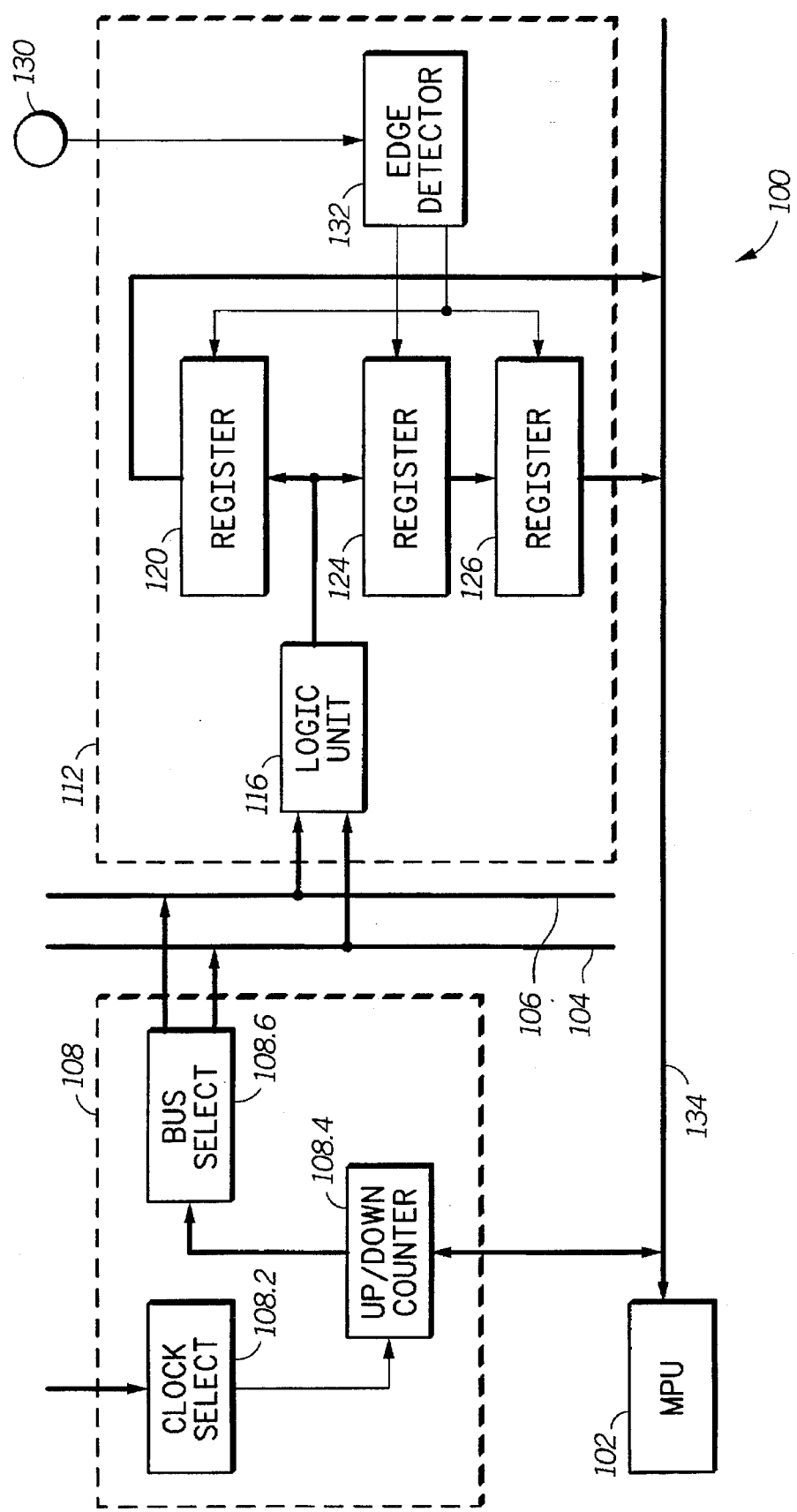
FIG. 2 shows a block-schematic functional circuit diagram of the timing unit of FIG. 1 used with a free-running counter to measure pulse width.

Reference is now made to FIG. 2, which shows only those portions of the arrangement of FIG. 1 employed in the input double edge pulse width measurement mode. FIG. 2 shows a form of the generic embodiment of FIG. 1 in which the counter 108 is composed of a clock select unit 108.2 (which is triggered from a prescaler or pin—not shown), a 16-bit up-counter 108.4 and a bus select unit 108.6. The counter 108.4 and the registers 120 and 126 communicate via data bus 134 with the microprocessor 102.

In the input double edge pulse width measurement mode, the registers 120 and 124 are employed as input capture registers. When a first edge, the leading edge, occurs the timer value is stored in register 124. When a second edge, the trailing edge, occurs the timer value is stored in register 120 and the previously captured value in register 124 is transferred to register 126. The software need only read the registers once per cycle of the input pulse waveform (not shown), rather than on every pulse edge. When a software interrupt is used, it occurs after the second edge of the measured pulse. The software can determine the pulse width at any time by reading the captured register sample values corresponding to the two different polarity pulse edges, and can then simply subtract them to determine the pulse width.

The leading edge sample is double-latched in the register 126, so that the microprocessor has the time of one full period of the input signal to read both register samples before they are over-written with samples from the next pulse. Even if the input period exceeds the potential software response time, the architecture of the double-edge timing unit 112 still allows the software to obtain two samples that are ensured to be coherent: the software can, asynchronously to the input signal, read a double word that contains the trailing edge capture value in register 120 and the double-latched leading edge captured value in register 126 to ensure that the two samples were taken from the same pulse.

In the example shown in FIG. 2, the counter 108 is used as a free-running counter which forms the time-base for the double edge timing unit 112. When the leading edge (which may be chosen as the rising or falling edge by appropriately programming the edge detector unit 132) of the input signal occurs, the state of the time-base bus is saved in the register 124. When the trailing edge occurs the state of the time-base bus is saved in the register 120, and the content of the register 124 is transferred to the register 126, leaving the register 124 free for the next trailing edge to occur (which can be as soon as the next clock cycle). A double word software read operation first reads register 120 then reads register 126, so that if the double word read cycle is half-completed when the trailing edge of the input signal occurs the transfer of register 124 to register 126 is delayed until the second half of the read cycle is completed. If enabled, an interrupt is provided after the trailing edge to notify the software that pulse width measurement data is available for a new pulse. After the trailing edge the software has the time of one period of the input signal to read the register values for each edge. If software intervention is not needed for each pulse the interrupt can be disabled.

It will be understood that the register 124 does not need to be visible to the software. It is convenient to have the registers 120 and 126 address-mapped proximately (e.g., consecutively) so that the software can read both read registers coherently (using a 32-bit read instruction) to obtain the latest pulse width capture values.

When the system is implemented with 16-bit resolution, signals with pulse duty cycles from 0.0015 to 99.9985% can be measured. The software workload is less than half that needed with a timer which requires one edge sample to be read and saved in RAM and then waits for the second edge before reading its value and calculating the pulse width. The system of FIG. 1 and FIG. 2 thus allows shorter pulses to be measured and reduces the software overhead of pulse width measurement.

Input Period Measurement Mode

Figure 3:
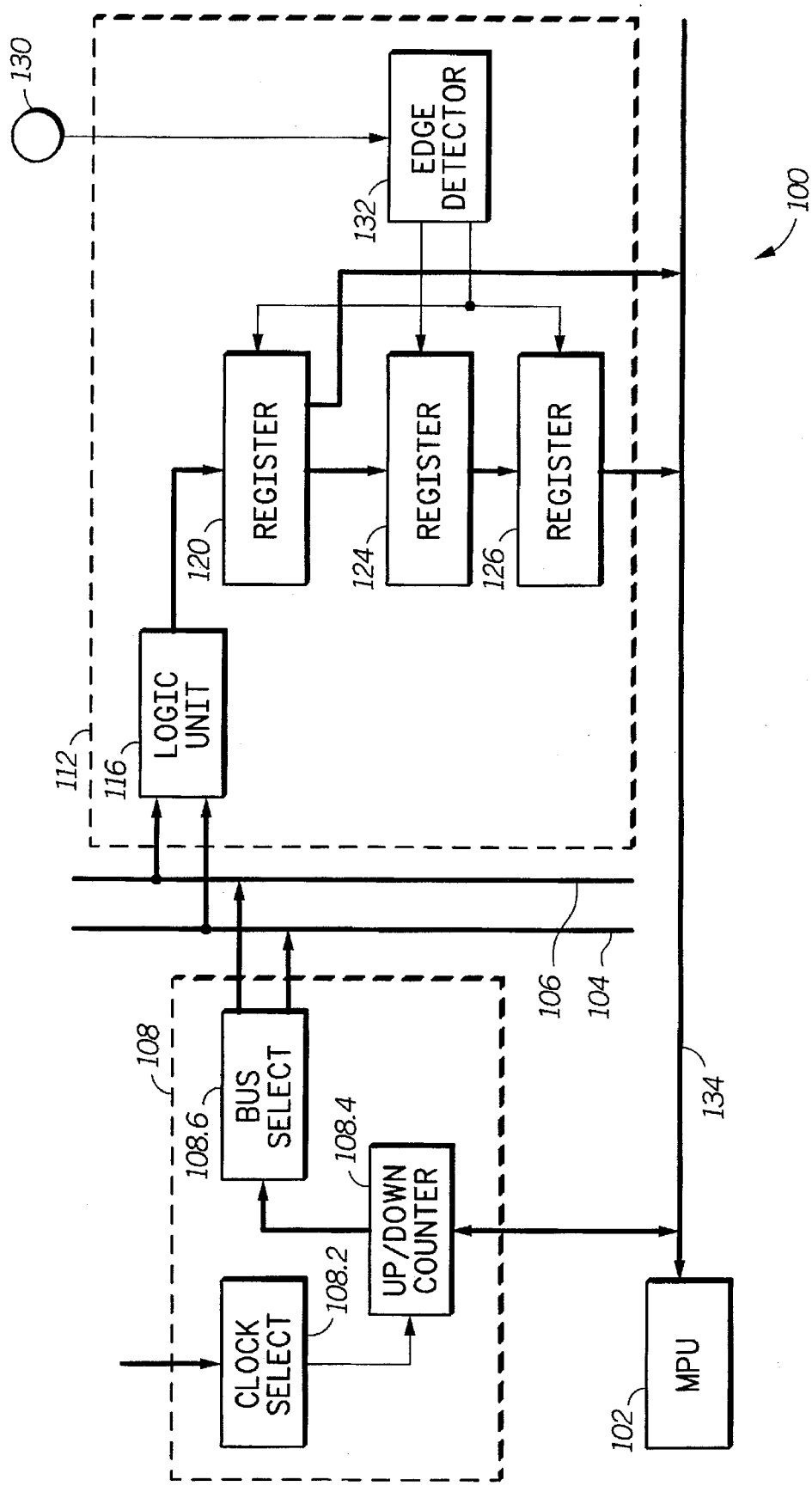
FIG. 3 shows a block-schematic functional circuit diagram of the timing unit of FIG. 1 used with a free-running counter to measure pulse period.

Reference is now made to FIG. 3, which shows only those portions of the arrangement of FIG. 1 employed in the input period measurement mode. FIG. 3 shows a form of the generic embodiment of FIG. 1 in which the counter 108 is composed (as in FIG. 2) of a clock select unit 108.2 (which is triggered from a prescaler or pin—not shown), a 16-bit up-counter 108.4 and a bus select unit 108.6. The counter 108.4 and the registers 120 and 126 communicate via data bus 134 with the microprocessor 102.

In the input period measurement mode, the registers 120 and 124 are employed (as in the pulse width measurement mode described above with reference to FIG. 2) as input capture registers. However, in the input period measurement mode the edge detector is programmed to trigger only upon an edge of a single polarity (which may be chosen as the rising or falling edge, as desired). Thus, two samples are available to the software for period measurement, and the software can subtract the two sample values to determine the period of the input signal. When the designated edge is detected, the current time base value is latched into register 120 and the value captured due to the previous designated edge is transferred from register 124 to register 126. After the designated edge, the content of register 120 is transferred to register 124. As with pulse width measurement described above, the software can be sure of not missing samples by ensuring that the interrupt response time is faster than the fastest input period. Even if the input period exceeds the potential software response time, the architecture of the double-edge timing unit 112 still allows the software to obtain two samples that are ensured to be consecutive: the software can, asynchronously to the input signal, read a double word that contains the most recent capture value in register 120 and the previous capture value in register 126 to ensure that the two samples were taken from consecutive pulses.

In the example shown in FIG. 3, the counter 108 is used as a free-running counter which forms the time-base for the double edge timing unit 112. When the designated edge (which may be chosen as the rising or falling edge by appropriately programming the edge detector unit 132) of the input signal occurs, the state of the time-base bus is saved in the register 124. When the next designated edge occurs, the state of the time-base bus is saved in the register 120 and the content of the register 124 is transferred to the register 126. After register 120 is latched and stable, the content of register 120 is latched into register 124. A double word software read operation first reads register 120 then reads register 126, so that if the double word read cycle is half-completed when the designated edge of the input signal occurs, the transfer of register 124 to register 126 is delayed until the second half of the read cycle is completed. If desired an interrupt may be provided after each designated edge to notify the software that pulse period measurement data is available for a new cycle. After the designated edge the software has the time of one period of the input signal to read the register values for each edge. If software intervention is not needed for each pulse the interrupt can be disabled.

It will be understood that the register 124 does not need to be visible to the software. It is convenient to have the registers 120 and 126 address-mapped consecutively so that the software can read both read registers coherently (using a 32-bit read instruction) to obtain the latest pulse period capture values.

When the system is implemented with 16-bit resolution, signals with waveform periods from 0.0015 to 99.9985% of the time-base period can be measured. The software workload is less than that needed with a timer which requires one edge sample to be read and saved in RAM and then waits for the second edge before reading its value and calculating the pulse width. The system of FIG. 1 and FIG. 3 thus allows shorter periods to be measured and reduces the software overhead of pulse width measurement.

One-Time Double Edge Pulse Output Compare Mode

Figure 4:
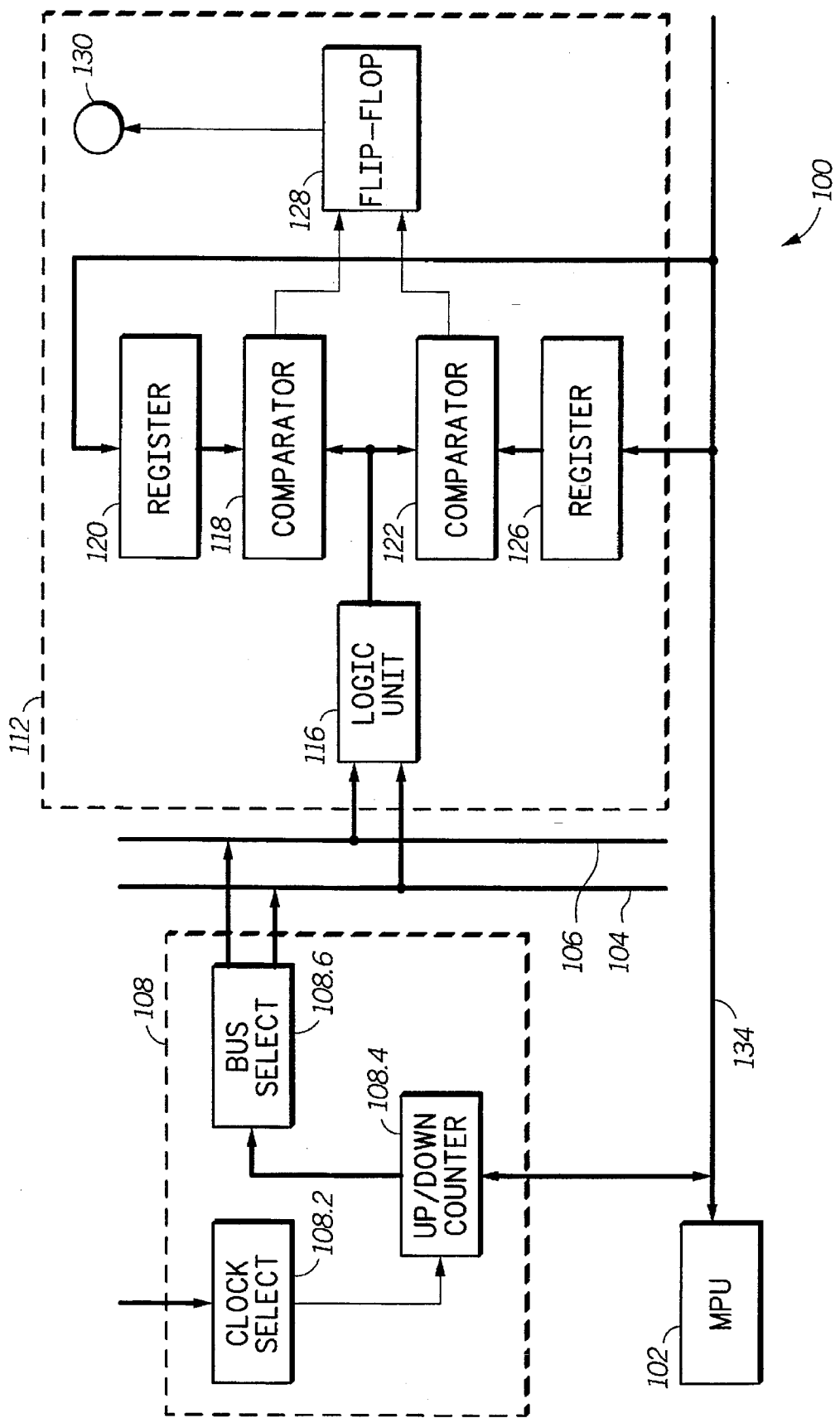
FIG. 4 shows a block-schematic functional circuit diagram of the timing unit of FIG. 1 used with a free-running counter to generate a pulse.

Reference is now made to FIG. 4, which shows only those portions of the arrangement of FIG. 1 employed in the one-time double edge pulse output compare mode. FIG. 4 shows a form of the generic embodiment of FIG. 1 in which the counter 108 is composed of a clock select unit 108.2 (which is triggered from a prescaler or pin—not shown), a 16-bit up-counter 108.4 and a bus select unit 108.6. The counter 108.4 and the registers 120 and 126 communicate via data bus 134 with the microprocessor 102.

In the one-time double edge pulse output compare mode, the microprocessor software pre-loads a comparison value for one edge of the desired output pulse into the register 120 and pre-loads a comparison value for the other edge of the desired output pulse into the register 126. The comparators 118 and 122 each continually compare the content of their respective associated registers 120 and 126 with the current time on the time-base bus, and when a comparison is successful, causes the output flip-flop 128 to change its state. Thus the double edge timing unit 112 automatically creates both edges of the desired output pulse by changing the state of the flip-flop 128 (which drives the output pin 130) in accordance with the values pre-loaded into the registers 120 and 126.

After the trailing edge of the pulse has been generated, the double edge timing unit 112 stops and waits further commands from the software. The two comparators 118 and 122 are automatically enabled when write operations are performed to their respective registers, and the comparators remain enabled until the next successful corresponding comparison, after which the comparators are disabled until the software next writes new comparison values to the registers 120 and 126. In one-time double edge pulse output compare mode the register 124 is not used and does not need to be visible to the software.

As with the input modes described above with reference to FIG. 2 and FIG. 3, it is convenient to have the registers 120 and 126 address-mapped consecutively so that the software can write to both of these registers at any time with a single 32-bit instruction.

When the system is implemented with 16-bit resolution, signals with pulse duty cycles from 0.0015 to 99.9985% can be generated. The software workload is less than half that needed with a timer which requires a value for a first edge to be written and then waits for the first edge to occur before writing a value for the second edge. The system of FIG. 1 and FIG. 4 thus allows shorter pulses to be generated and reduces the software overhead of pulse generation.

Continous Output Pulse-Width-Modulation (PWM) Mode

Figure 5:
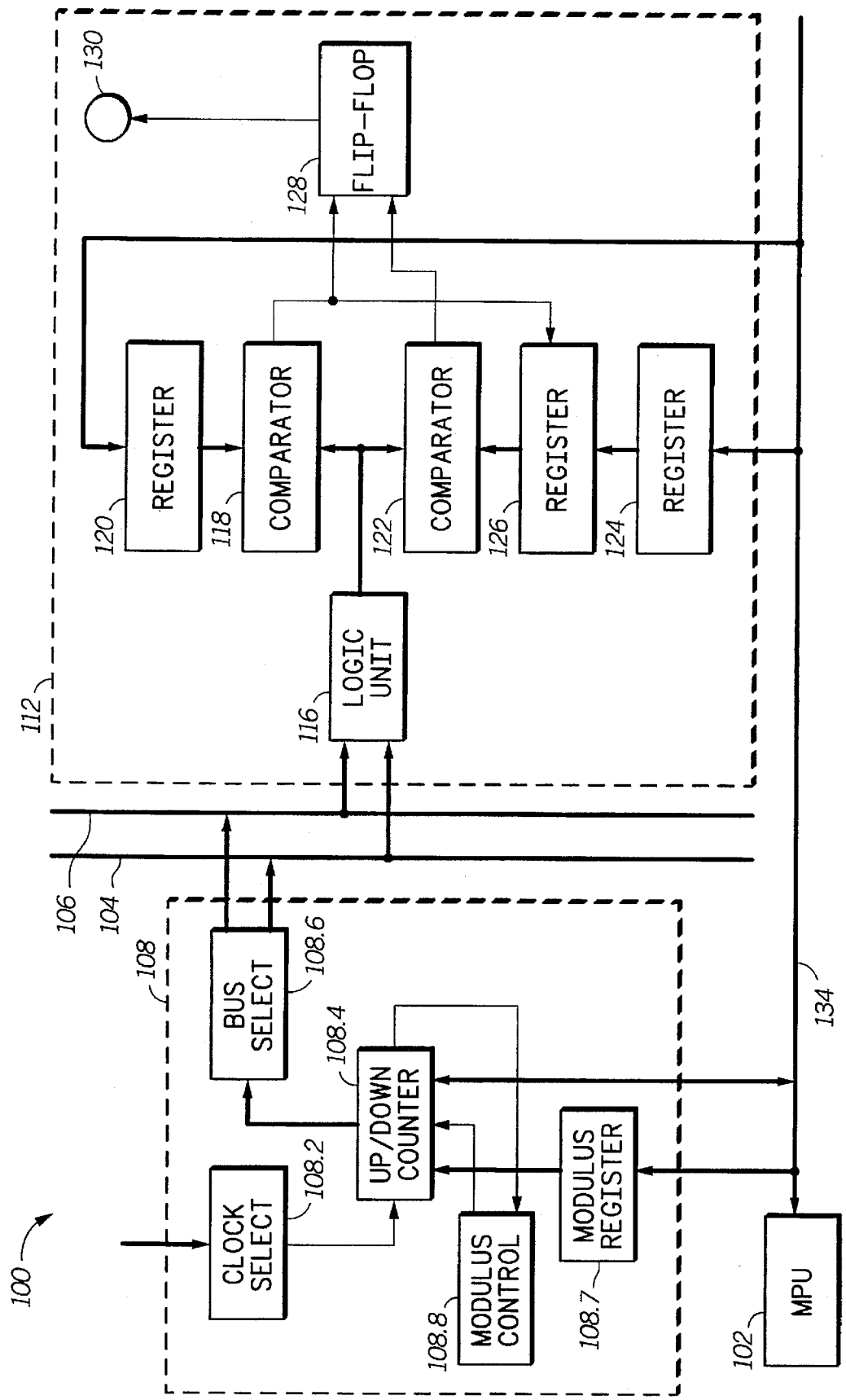
FIG. 5 shows a block-schematic functional circuit diagram of the timing unit of FIG. 1 used to generate a pulse-width modulated signal.

Reference is now made to FIG. 5, which shows only those portions of the arrangement of FIG. 1 employed in the continuous output pulse-width-modulation (PWM) mode. FIG. 5 shows a form of the generic embodiment of FIG. 1 in which the counter 108 is includes a clock select unit 108.2 (which is triggered from a prescaler or pin—not shown), a 16-bit up-counter 108.4 and a bus select unit 108.6. The counter 108 also includes a modulus register 108.7 for holding a pre-loaded modulus value and a modulus control unit 108.8 to control the loading of the up-counter 108.4 with the value in the modulus register 108.7. The counter 108.4, the modulus register 108.7 and the registers 120 and 126 communicate via data bus 134 with the microprocessor 102.

In the continuous output pulse-width-modulation (PWM) mode, output waveforms can be generated with any duty cycle without continued software involvement. The software loads the registers of the double edge timing unit 112 with the compare values for the leading and trailing edges, and they are automatically repeated; the software need not respond to interrupts to generate continuous unchanging pulses. The period of the pulses is selected by the software writing a desired value into the modulus register 108.7.

The software writes the leading edge value into the register 120, and writes the trailing edge value into the register 124. When the leading edge value is reached, the content of the register 124 is transferred to the register 126 to form the next trailing edge value. Subsequent changes to the output pulse width are made by writing a new value into the register 124; the software is free to write such a new value at any time because the double edge timing unit 112 synchronises changes to the leading edge of the output waveform when the content of the register 124 is transferred to the register 126.

The pulse width modulation mode of the system of FIG. 5 would typically be used without interrupts to continuously generate an unchanging repetitive pulse waveform without any further software intervention, though an interrupt could be enabled to occur at the leading edge. With such an interrupt the pulse width can changed by a new trailing edge value being written to the register 124 (in which case the output changes on the next full pulse). When the software needs to change the output at a regular rate (e.g., for an acceleration curve) the leading edge interrupt gives the software the time of one period of the output signal to provide the new trailing edge time.

It will be appreciated that, as in the other modes described above, only the registers 120 and 124 need to be accessible to the software, the register 126 not needing to be directly accessible.

It will be understood that as an alternative to using the modulus register 108.7 to determine the period of the pulse-width-modulated output signal, the period may be selected as the period of a free-running counter time-base times a multiplier of the form $2^n$ (where n is an integer) selected in the double edge timing unit 112. It will also be appreciated that, although not so shown, multiple PWM out signals can be provided from multiple double edge timing units such as 112, which units may all share the same counter provided that the periods of the output signals are all $2^n$ multiples of the counter time base. Each of the double edge timing units could have a software-selectable "don't care" implemented on high order bits of the time-base comparison so that the period of one output could be a $2^n$ multiple of another signal. Masking the time base in this way serves to multiply the period of the time base by $2^n$ to form the period of the output PWM signal. The duty cycle of the output PWM signal can thus vary from 1 to $2^{16}$ cycles.

When the system is implemented with 16-bit resolution, signals with pulse duty cycles from 0.0015 to 99.9985% can be generated. There is no further software workload required (after the writing of the leading and trailing edge register values) to maintain the generation of a steady PWM output, compared with a timer which requires a value for a first edge to be written and then waits for the first edge to occur before writing a value for the second edge, then repeats this procedure for each cycle. The system of FIG. 1 and FIG. 5 thus allows shorter pulses to be generated and reduces the software overhead of PWM pulse generation.

It will be appreciated that various other modifications or alternatives to the above described embodiment will be apparent to a person skilled in the art without departing from the inventive concept.

For example, in the preferred embodiment one intermediate holding register (either register 124 or register 126 depending on which mode is in use) is implemented, but any number of intermediate holding registers may be implemented in alternative embodiments. The single intermediate holding register in the preferred embodiment illustrates the principle of giving the microprocessor one full cycle time of the input/output signal to respond, and with the simple addition of further registers or read/write memory in the path of each edge capture/compare register the software can be given two, or any greater number of, cycles to obtain/provide new data.

Also, the time-base used as a reference for the input capture and output compare operations can easily be more or less flexible than shown in FIGS. 1–5. For example, the time-base can be as a simple as a single binary counter, or as complex as providing separate choices for each edge from among any number of binary counters, modular counters or other timed encodings. Further, the time-base source may be shared with other similar or different timing units (not shown).

In the preferred embodiment a single pin is used for both input and output functions of a combined input and output arrangement, but it will be appreciated that separate input and output pins could be provided or that the invention could be implemented as an input-only timing unit or as an output-only timing unit.

Also, although the preferred embodiment is implemented with 16-bit time-base buses, the invention could alternatively be implemented with an arrangement based upon fewer or more bits.

Further, although in the preferred embodiment the registers may be interfaced to a 16-bit or 32-bit microprocessor on the same integrated circuit, the processor could alternatively be provided on a different integrated circuit, and/or the processor could be of a more specialised type, such as an input/output processor. Also, the processor word size could be smaller or larger. Also, the data transfer bus between the processor and the timing unit could have more, or fewer, than 16 bits. Alternatively, data could be transferred via a serial data interface method, and the method of reading and writing capture and/or compare values could be via software read and write instructions or via direct transfer to/from a read/write memory.

We claim:

1. A pulse sensing arrangement for use in a microprocessor system, the arrangement comprising:
   an input node for receiving thereat an input signal;
   edge detection means coupled to the input node for sensing pulse edges in the input signal;
   timer means for producing time values; and
   input register means responsive to the edge detection means for holding time values produced by the timer means corresponding to edges detected by the edge detection means wherein the input register means comprises a first register for holding a time value produced by the timer means corresponding to a first edge detected by the edge detection means; a second register for holding a time value produced by the timer means corresponding to a second edge detected by the edge detection means; and a third register for holding the value from the first register while the first register's value is updated.

2. An arrangement according to claim 1 wherein the first register and the third register are address-mapped with proximate addresses so as to allow their values to be accessed with a single operation.

3. A pulse generation arrangement for use in a microprocessor system, the arrangement comprising:

an output node for producing thereat an output signal;

timer means for producing time values;

output register means for holding values corresponding to pulse edges to be generated;

comparator means for comparing the values held in the output register means with time values produced by the timer means; and bistable means coupled to the output node for generating at the output node a signal whose state changes in response to the comparator means;

wherein the output register means comprises a first register for holding a value corresponding to a first edge to be generated; a second register for holding a value corresponding to a second edge to be generated; and a third register for holding the value from the first register while the first register's value is updated.

4. An arrangement according to claim 3 wherein the first register and the third register are address-mapped with proximate addresses so as to allow their values to be accessed with a single operation.

5. An arrangement according to claim 3 wherein the bistable means is arranged to produce a single pulse output signal in response to values being written to the output register means.

6. An arrangement according to claim 3 wherein the bistable means is arranged to produce a continual pulse output signal in response to values being held in the output register means.

7. A microprocessor system including said pulse generation arrangement according to claim 3.

8. A microprocessor system including said pulse generation arrangement according to claim 4.

9. A pulse generation and sensing arrangement for use in a microprocessor system, the arrangement comprising:

an input/output node for receiving thereat an input signal in a first mode of operation and for producing thereat an output signal in a second mode of operation;

edge detection means coupled to the input/output node for sensing pulse edges in the input signal in the first mode of operation;

timer means for producing time values;

register means having a first register, a second register and a third register arranged such that in the first mode of operation the first register holds a time value produced by the timer means corresponding to a first edge detected by the edge detection means; the second register holds a time value produced by the timer means corresponding to a second edge detected by the edge detection means; and the third register holds the value from the first register while the first register's value is updated; and in the second mode of operation the first register holds a value corresponding to a first edge to be generated; the second register holds a value corresponding to a second edge to be generated; and the third register holds the value from the first register while the first register's value is updated;

comparator means for comparing the values held in the output register means in the second mode of operation with time values produced by the timer means; and bistable means coupled to the output node for generating at the input/output node in the second mode of operation a signal whose state changes in response to the comparator means.

10. An arrangement according to claim 9 wherein the first register and the third register are address-mapped with proximate addresses so as to allow their values to be accessed with a single operation.

11. A microprocessor system including said pulse sensing and generation arrangement according to claim 9.

12. A microprocessor system including said pulse sensing and generation arrangement according to claim 10.

* * * * *